United States Patent [19]
Jensen

[11] Patent Number: 5,470,155
[45] Date of Patent: Nov. 28, 1995

[54] APPARATUS AND METHOD FOR MEASURING TEMPERATURES AT A PLURALITY OF LOCATIONS USING LUMINESCENT-TYPE TEMPERATURE SENSORS WHICH ARE EXCITED IN A TIME SEQUENCE

[75] Inventor: Earl M. Jensen, Sunnyvale, Calif.

[73] Assignee: Luxtron Corporation, Santa Clara, Calif.

[21] Appl. No.: 75,743

[22] Filed: Jun. 11, 1993

[51] Int. Cl.⁶ .................................................. G01K 11/20
[52] U.S. Cl. ........................ 374/161; 374/137; 364/557; 250/459.1
[58] Field of Search .................................. 374/161, 137, 374/131; 250/458.1, 459.1; 364/557

[56] References Cited

U.S. PATENT DOCUMENTS

| | | | |
|---|---|---|---|
| 4,409,476 | 10/1983 | Lofgren et al. | 374/161 |
| 4,560,286 | 12/1985 | Wickersheim | 374/131 |
| 4,652,143 | 3/1987 | Wickersheim et al. | 374/161 |
| 4,816,687 | 3/1989 | Fehrenbach et al. | 250/459.1 |
| 5,035,511 | 7/1991 | Berthold | 374/137 |
| 5,043,585 | 8/1991 | Fehrenbach et al. | 250/459.1 |
| 5,107,445 | 4/1992 | Jensen et al. | 374/161 |

FOREIGN PATENT DOCUMENTS

| | | | |
|---|---|---|---|
| 0069925 | 3/1989 | Japan | 374/137 |

*Primary Examiner*—Diego F. F. Gutierrez
*Attorney, Agent, or Firm*—Majestic, Parsons, Siebert & Hsue

[57] ABSTRACT

A system for measuring a parameter, such as temperature, by multiple sensors that include luminescent material. A parameter dependent characteristic, such as decay time, of each sensor's luminescence radiation emitted in response to appropriate excitation, such as in the form of a pulse, is measured. Automatic gain control is provided by adjusting the duration of the excitation radiation pulses instead of their intensities. An undesired effect of excitation radiation directly striking the photodetector is minimized by subtracting a compensating signal from the photodetector output signal, that compensating signal being provided through a compensating photodetector connected in series with the luminescence receiving photodetector. Multiple sensors are handled by the electronic system through time division multiplexing, separate photodetectors provided for the sensors being connected in parallel while their associated sensors are excited to luminescence one at a time. An offset signal from the commonly connected photodetectors is measured in the absence of luminescence from any of the sensors and used to adjust the parameter dependent characteristic of each sensor's luminescent radiation.

9 Claims, 6 Drawing Sheets

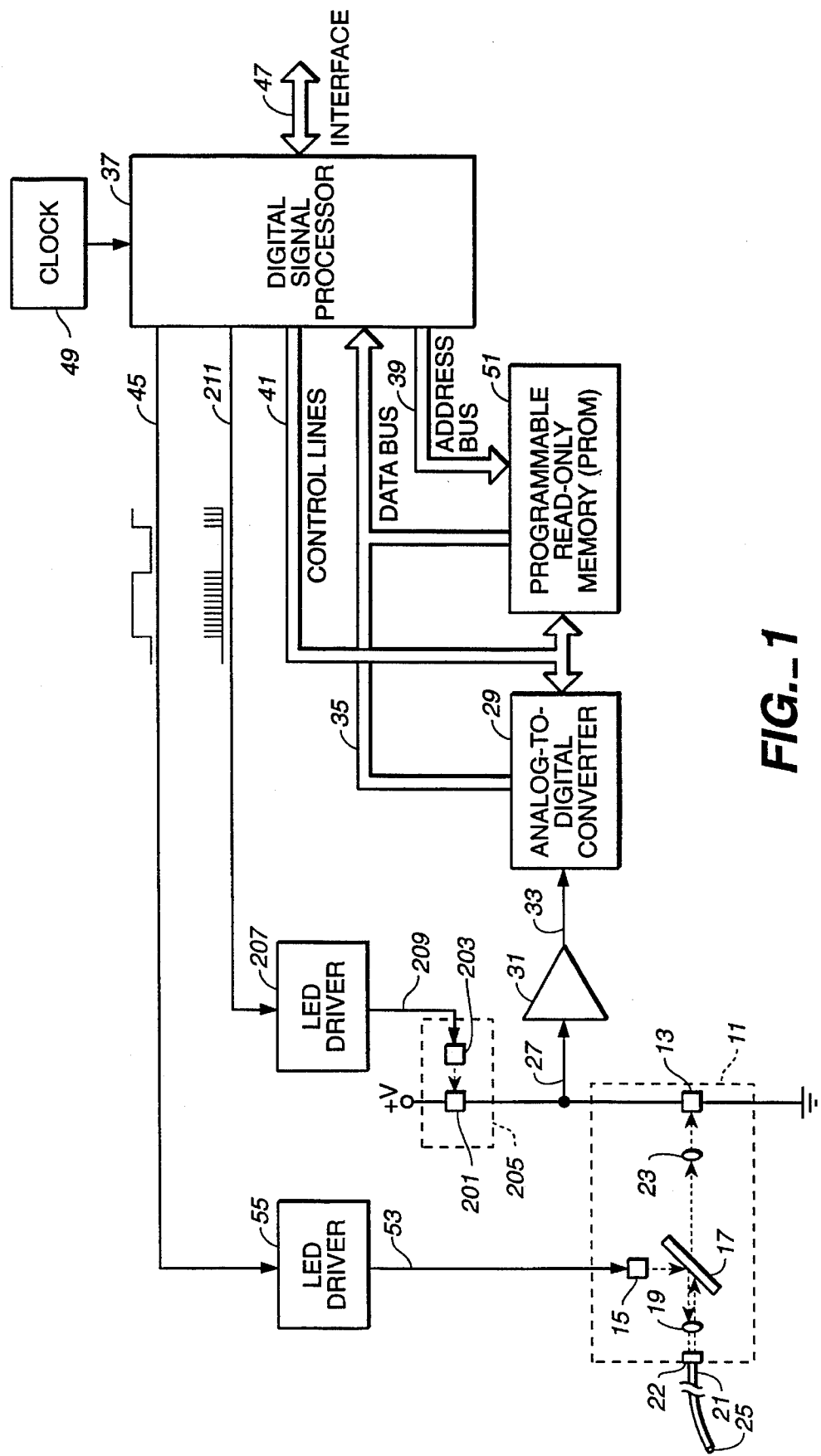
FIG._1

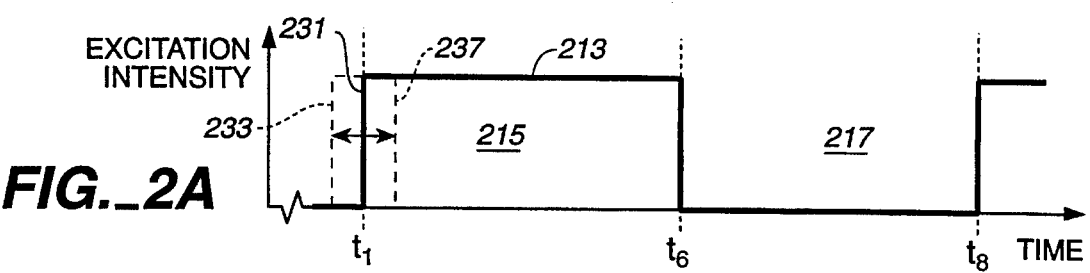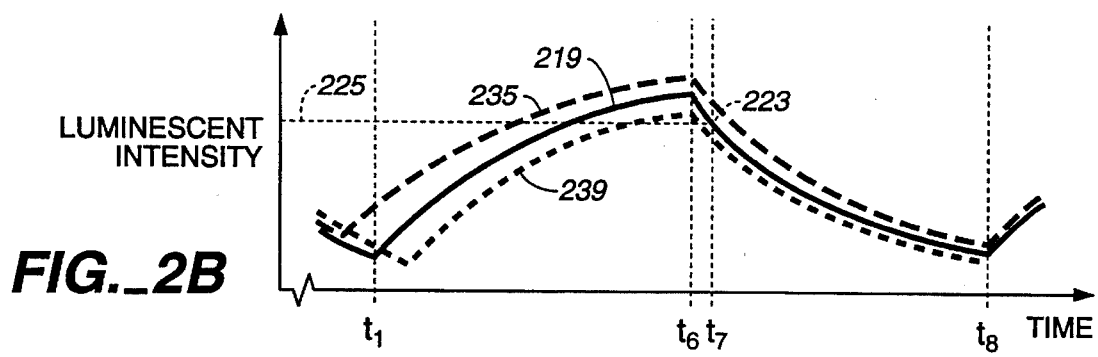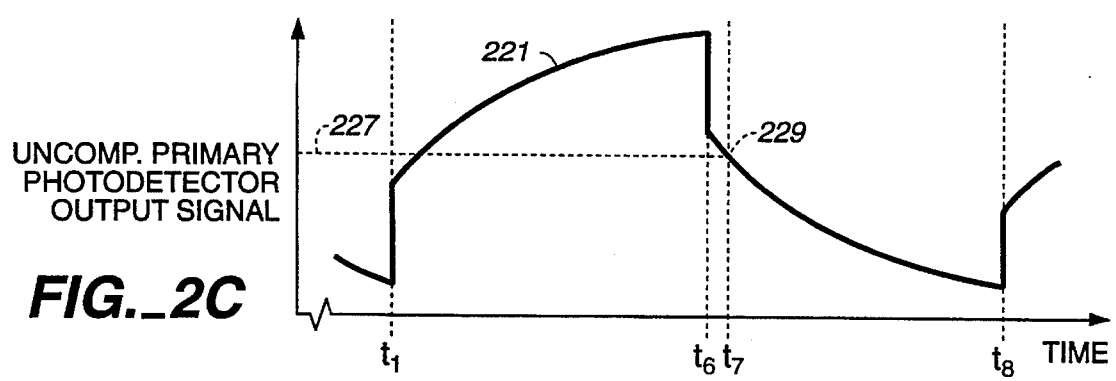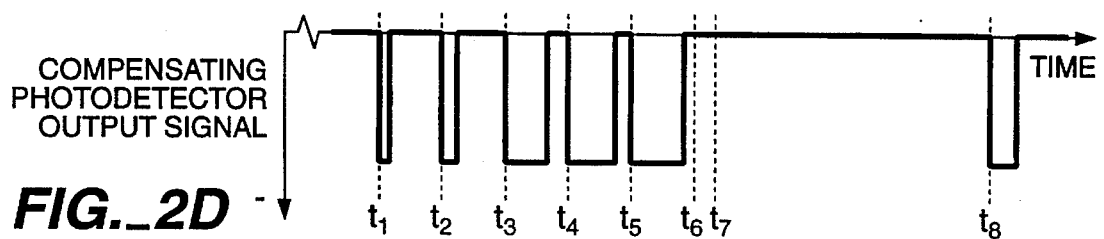

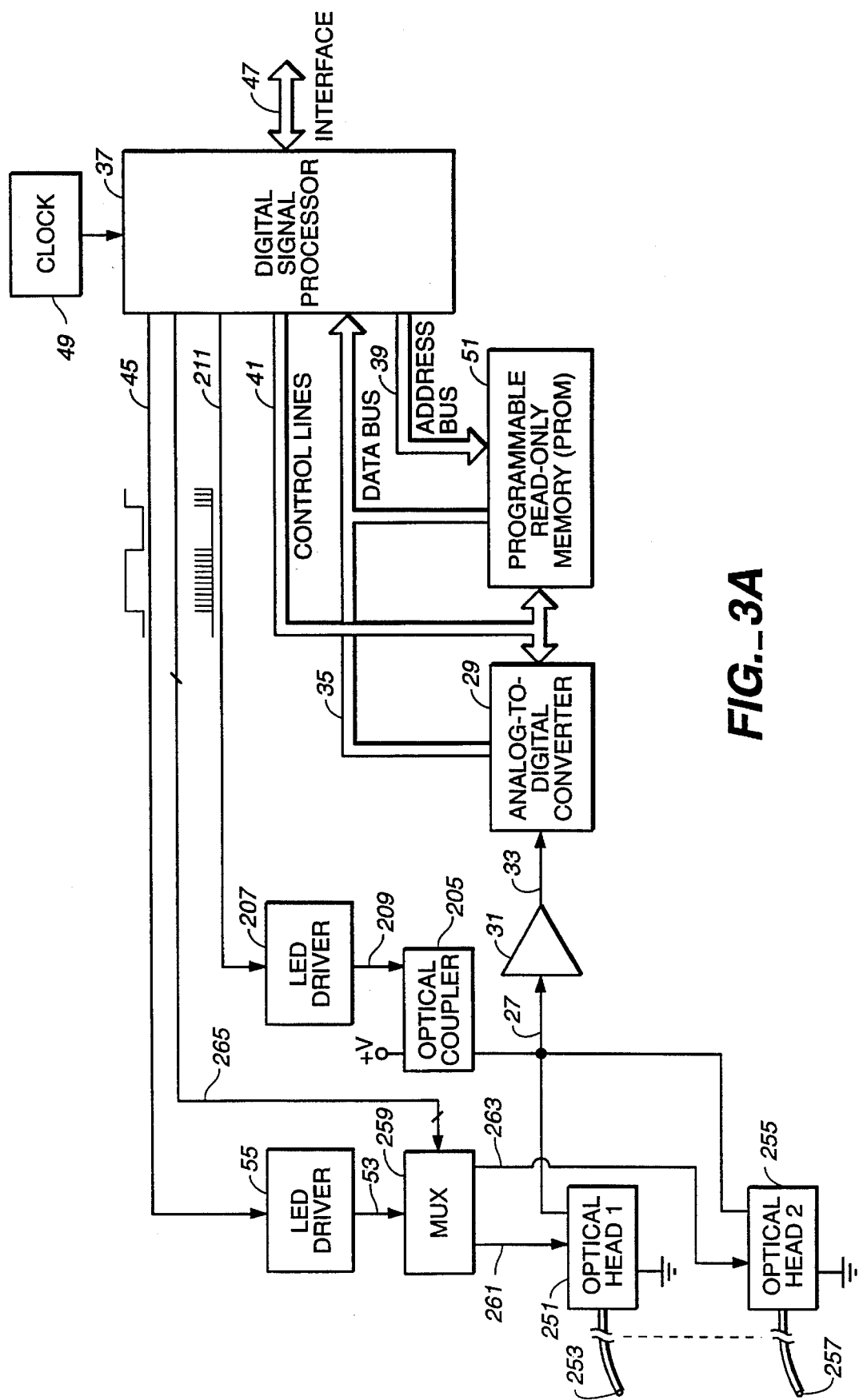
FIG._3A

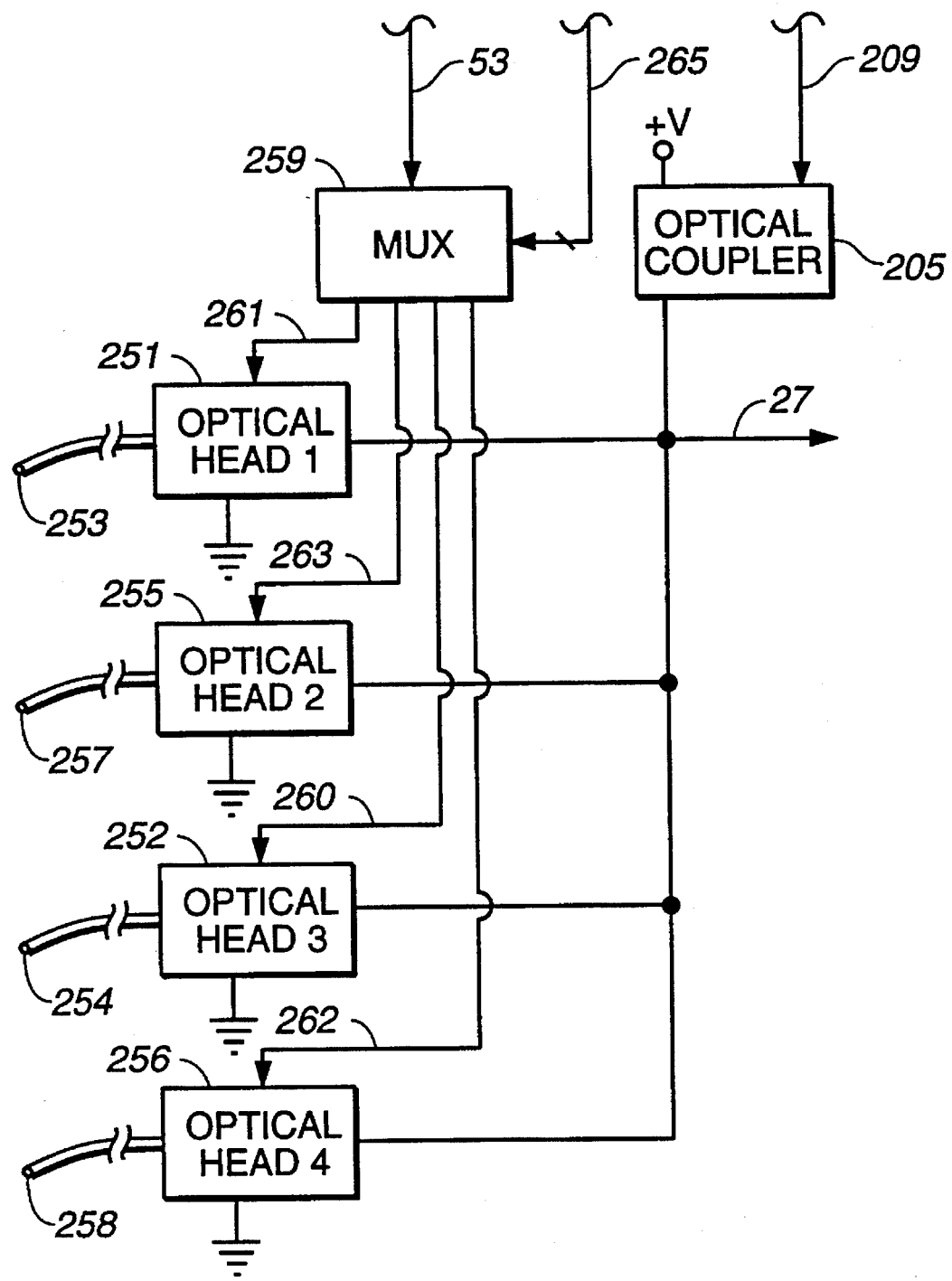
FIG._3B

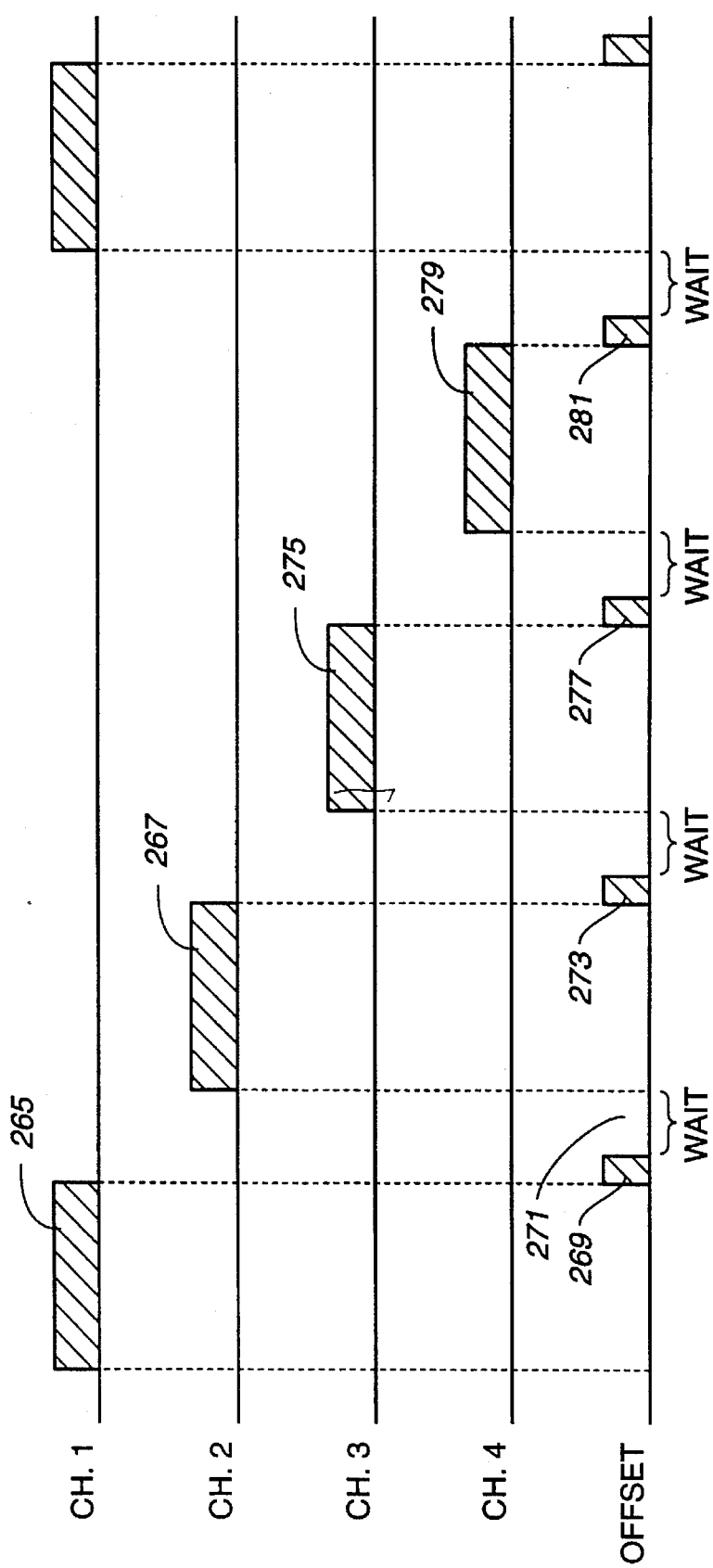
FIG._4

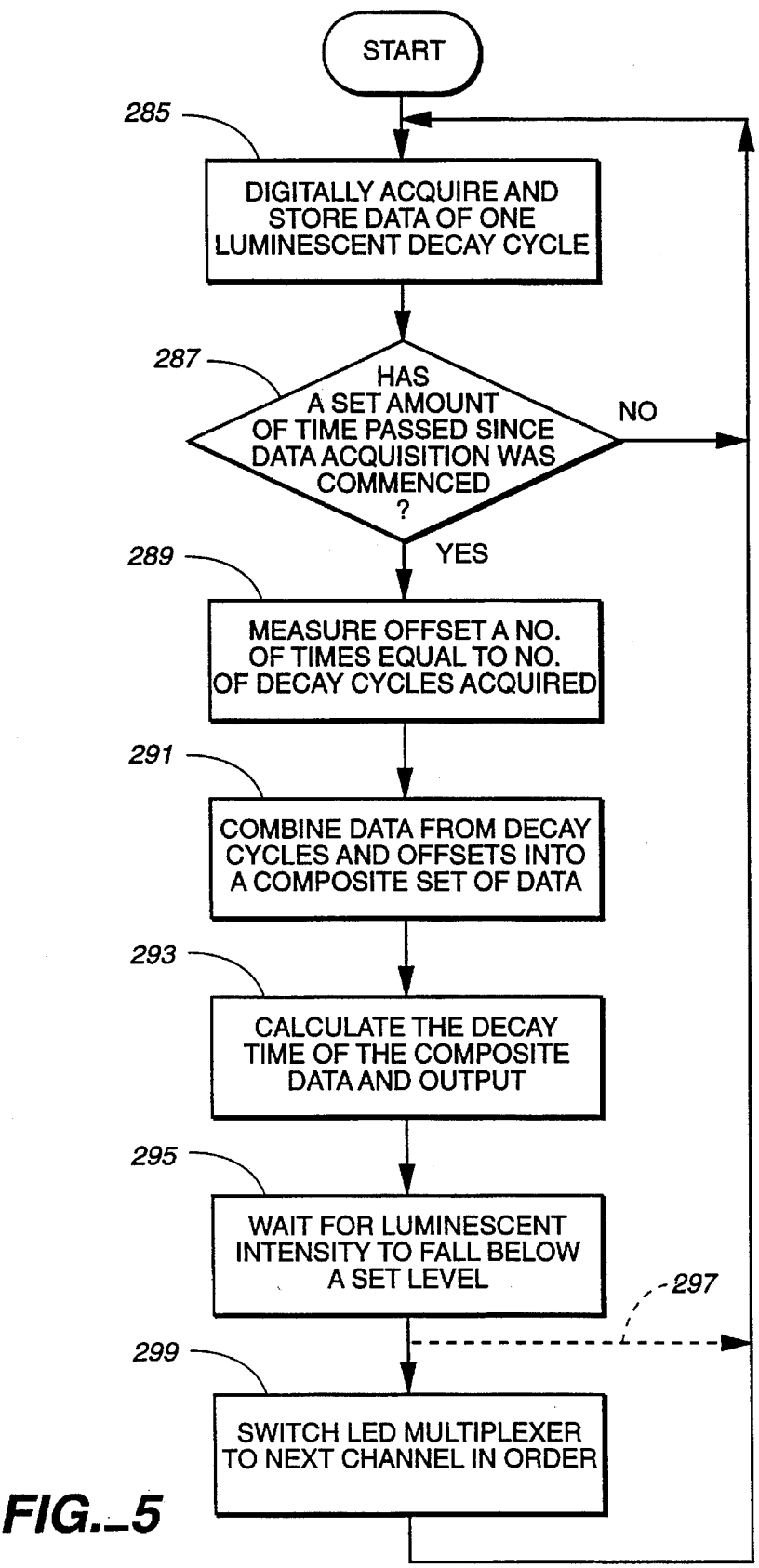
FIG._5

APPARATUS AND METHOD FOR MEASURING TEMPERATURES AT A PLURALITY OF LOCATIONS USING LUMINESCENT-TYPE TEMPERATURE SENSORS WHICH ARE EXCITED IN A TIME SEQUENCE

BACKGROUND OF THE INVENTION

This invention relates generally to the art of measuring physical parameters such as temperature by optical techniques, and, more specifically, to implementations that detect a time rate of decay of luminescence that is proportional to the temperature or other parameter being measured.

Optical techniques using luminescent sensors to measure temperature have in recent years become accepted for many applications and several commercial products have appeared. Some temperature dependent characteristic of the luminescent emission is measured and the temperature of the sensor determined from that measurement. The temperature of a surface can be measured by making direct contact between such a small luminescent sensor and the surface, or by applying the luminescent material directly on the surface, and then detecting the temperature-dependent luminescence by some type of remote or contact optical system. Such an optical system can use a length of optical fiber as one optical element. This technique has particular application for measuring the temperature of difficult to contact surfaces such as the surface of a rotating piece of machinery.

Commercially available products often attach the luminescent sensor at an end of a length of optical fiber to form a temperature-sensing probe. The temperature sensing probe is then placed in contact with an object, or within an environment, whose temperature is to be measured. The other end of the optical fiber is then connected to a measuring instrument. Since neither the sensor nor the optical fiber are sensitive to electrical or magnetic fields, temperatures may be measured in environments that are hostile to other measuring systems, such as in high voltage fields, intense electromagnetic radiation fields or beams, or environments which contain chemicals which might corrode electrical sensors or their metallic leads. Optical fiber probes may also be made to be implanted in the human body for measuring internal body fluid or tissue temperatures. Since the optical fibers do not conduct electricity, the probes can be used in the processing of flammable or explosive materials where electrically safe sensors are required. Also, since the sensors have very small mass and since the fibers do not conduct heat away from the measurement location, more accurate sensing is possible. Further, such fiberoptic probes may be permanently installed in large, expensive electrical equipment, such as electrical generators and power transformers. The very small size of the sensor and optical fiber cable, as well as its immunity from environmental factors that prevent more conventional temperature sensing techniques from being used, contribute to a wide range of additional applications.

The temperature-dependent characteristic of luminescence that is emerging as preferred for use in commercial systems is the temperature sensitivity of its time rate of decay. Luminescent materials used as temperature sensors, in response to a pulse of radiation that causes them to commence luminescence, exhibit a decay of their luminescence, after termination of the exciting pulse, with a rate which varies with temperature. The most desirable luminescent materials for such use exhibit an exponential decay of luminescent intensity after cessation of the excitation radiation. This then allows the temperature being measured to be correlated with a decay "time constant" of the luminescence, a quantity normally referenced as $\tau$, which is defined as the time to reach 1/e of the initially measured value of the decaying luminescence, where "e" is the natural logarithm base 2.71828 . . . .

Luminescence decay time instrumentation has generally used analog electronic circuits for signal processing. More recently, digital techniques have been employed. An example of a digital system is described in U.S. Pat. No. 5,107,445 of Jensen et al., assigned to Luxtron Corporation, assignee of the present application. This patent disclosure is expressly incorporated herein by this reference. In addition to using digital signal processing techniques, this patent describes forming on a single printed circuit card or board, the entire optical and electronic system for determining the decay time of a luminescence based sensor that is optically coupled with the board.

It is an object of the present invention to improve the structure and operation of the electronic system disclosed in the previously mentioned U.S. Pat. No. 5,107,445.

In such digital systems, an input signal must generally be acquired and amplified before the signal is digitally sampled in order to perform the digital processing. It is, therefore, a more specific object of the present invention to provide an improved "front end" analog system for use in such a digital processing system.

It is a further object of the present invention to adapt such a system to process signals from multiple sensors without making either the system or its operation significantly more complex.

It is a more general object of the present invention to provide a luminescent sensor-based measurement system that is usable with confidence over a long period of time to provide accurate results with consistency.

It is another general object of the present invention to provide a luminescent sensor-based measuring system that is small and compact, has low power requirements, and exhibits a high degree of ruggedness, for use in many different specific applications.

SUMMARY OF THE INVENTION

According to a first aspect of the present invention, a beginning magnitude of each cycle of the decaying luminescent signal is maintained substantially constant by controlling the duration of each pulse of radiation that excites the sensor to luminescence. The system compares the signal magnitude of each cycle with a reference magnitude, and, in response to a difference, causes the next excitation pulse to have its duration adjusted to eliminate the difference during the next cycle. This is a type of closed loop automatic gain control but, instead of the usual adjustment in the intensity of the exciting radiation source, the duration of the excitation pulses are adjusted instead. This simplifies the usual processing circuitry by eliminating the need to convert a digital control signal into an analog current that controls the brightness of the excitation LED. The LED(s) that provide the excitation radiation for the luminescent sensing material are driven with substantially a constant current in order to produce a substantially uniform brightness.

According to a second aspect of the present invention, a controlled signal is subtracted from the photodetector signal during the excitation pulse in order to compensate for the effects of direct exposure of the luminescence signal photodetector to the excitation source. Even though steps are taken to optically isolate the photodetector from the excitation source, it is difficult to do so completely, especially since the trend is to simplify the optical system in order that it can be manufactured less expensively. The most significant negative effect of such direct exposure is to delay the time after termination of the excitation pulse that processing of the decaying luminescence signal may be begun. That is because it takes some time for an initial amplifier stage to respond to a sudden change in the level of signal it receives, as a result of the photodetector being directly exposed to some of the excitation radiation, when the excitation pulse terminates. Rather than reducing the gain of the amplifier during the excitation pulse, which then also takes time to recover after termination of the excitation pulse, a compensating signal is combined with the photodetector output in order to reduce it during the excitation pulse. According to a specific aspect of this invention, the compensating signal is generated by exposing a second photodetector connected in opposition to the first, a closed loop circuit being provided to maintain, at the input to the amplifier, a substantially constant signal at the level that is desired immediately after termination of the excitation pulse. This circuit has an advantage of not requiring a digital-to-analog converter that was necessary to generate an amplifier gain control signal used in the prior system. The technique provides a longer duration of the decaying signal that is processed in order to determine its decay time.

According to a third aspect of the present invention, signals from two or more sensors are processed in time sequence by a single electronic processing circuit. Rather than switching connection of the input amplifier among the separate photodetectors provided for each of the channels, however, the photodetectors remain connected to the amplifier input, in parallel with each other. This eliminates a source of error wherein a photodiode not connected to the amplifier input circuit will build up charge. Providing a separate input amplifier for each channel would significantly increase the cost of a multi-sensor system. Instead, it is the excitation of the luminescent material within the two or more sensors that occurs in time sequence. That is, in a preferred embodiment, a separate LED is provided for each sensor, only one being pulsed at a time. Driving current is applied to one of the LEDs at a time, in sequence, in order to provide two or more parameter measurements at what appears to be the same time.

Additional objects, advantages, features and of the various aspects of the present invention will become apparent from the following description of its preferred embodiments, which description should be taken in conjunction with the accompanying drawings.

BRIEF DESCRIPTION OF THE DRAWINGS

FIG. 1 schematically illustrates cooperating electronic and optical components of a single channel measuring system that incorporates various aspects of the invention;

FIGS. 2A–2E illustrate operation of the system of FIG. 1 by showing various exemplary optical and electronic signals thereof as a function of time;

FIG. 3A is an optical and electronic circuit diagram showing a modification to the system of FIG. 1 allows it to handle multiple channels, according to another aspect of the invention;

FIG. 3B shows a specific form of the system of FIG. 3A;

FIG. 4 includes time based curves that illustrate the multiple channel operation of the system of FIG. 1 when modified to include that shown in FIG. 3; and FIG. 5 is a flow chart that illustrates operation of the system of FIG. 1, both in single and multiple channel modes.

DESCRIPTION OF THE PREFERRED EMBODIMENTS

Referring initially to FIG. 1, all of the optical and electronic system shown is contained on a single printed circuit card or board. An optical head 11, mounted on the board, includes a photodetector 13, such as a photodiode or photomultiplier, and a light emitting diode ("LED") 15 as an excitation source. The electromagnetic radiation emitted by the LED 15, usually chosen to be in the infra-red region of the spectrum, is reflected by a dichroic beam splitter 17, through a lens 19, and through an optical fiber connector 22 to an end of an optical fiber transmission medium 21. The optical fiber 21 delivers the radiation from the LED 15 to a luminescence based sensor of temperature or some other parameter, whose luminescence is returned to the optical block 11, through the beam splitter 17 and a lens 23 before striking the detector 13. The detector 13 may be, as an example, a fast response time silicon photodiode. Since the excitation and luminescent wavelengths of the luminescence-based sensor are separated, the dichroic beam splitter 17 is designed to reflect a majority of the excitation radiation from the LED 15 while transmitting a majority of the luminescence radiation to the photodiode 13.

The optical fiber medium 21 can communicate with a number of forms of luminescence based sensors. A form illustrated in FIG. 1 is the provision of such a sensor 25 as part of a probe carried at a free end of the optical fiber medium 21. Such a probe is generally formed by attaching powdered luminescent material to an end of the optical fiber medium 21 with an optically clear binder. Alternatively, the luminescent material of the sensor may be attached to a surface whose temperature or other parameter is to be measured. A free optical fiber end is then positioned to direct excitation radiation onto the luminescent material and receive the resulting luminescence back from it. The optical fiber medium end can remain spaced a distance apart from the coated surface or allowed to contact it. In the case of a large separation, auxiliary light collecting optics, such as lenses or mirrors, may have to be used to image the fiber end onto the surface. The optical fiber medium 21 can be a bundle of fibers, but is preferably a single optical fiber.

The photodetector 13 is electrically connected in series with a second photodetector 201 in a manner that current generated by the photodetector 201, in response to receiving a radiation signal, subtracts from the current generated by the photodetector 13. A second LED 203 provides such a radiation signal. The photodetector 201 and LED 203 are most conveniently provided by including a standard optical coupler on the board. The purpose of this is to control the output of the luminescent signal photodetector 13 that is electronically processed, as described further below.

The net current from the photodetectors 13 and 201 is applied over line 27 to an input of an analog transconductance amplifier 31. This is a much simpler amplifier than that described with respect to FIG. 5 in the aforementioned U.S. Pat. No. 5,107,445. Particularly, the diodes D1, D2, D3 and D4 of the prior circuit, with their inherent non-linearities, have been eliminated. A voltage output in a line 33 is then digitized by an analog-to-digital ("A-to-D") converter 29. Some analog amplification of the net photodetector output is generally required so that the signal voltage applied to the A-to-D converter 29 is high enough for it to operate properly.

A digital representation of the amplified net photodetector signal is outputted by the A-to-D converter 29 onto a system data bus 35. This is the data bus of a suitable digital signal processor 37 that is commercially available. A separate address bus 39 and various peripheral chip control lines 41 are also provided. Two lines 45 and 211 are connected to output port pins of the processor 37. A bus 47 can also be connected to many available digital signal processors in order to communicate with a module that converts decay time to temperature and displays it. Alternatively, the processor may be connected to a host computer through the bus 47. In that case, the signal processor 37 appears to a host computer as a peripheral device. In either case, a separate system clock 49 is employed on the board.

Most commercial types of signal processors include a significant amount of random access memory ("RAM"), enough for the measurement system being described, so that external RAM chips are not required. A programmable read-only memory ("PROM") 51 is utilized, however, and is connected to both the data bus 35 and the address bus 39. The system operating program is contained within the PROM 51.

The system being described operates to excite the sensor to luminescence by repetitively pulsing the luminescent material with excitation radiation. In between pulses, characteristics of the decaying luminescence are then measured as an indication of the desired temperature or other parameter being monitored. Pulsing current is supplied to the LED 15 over a line 53 from a power control circuit 55. The power control circuit 55 receives a digital pulse signal from the processor 37 over a line 45. This signal specifies the duration and frequency of the light pulses emitted by the LED 15. As explained later, the processor 37 dynamically adjusts the duration of the LED pulses in order to maintain the intensity of the resulting luminescent signal returned to the photodetector 13 at a substantially uniform level.

Although the optical head 11 is designed to minimize the amount of light output of the LED 15 that strikes the photodetector 13, it is nearly impossible to prevent all such stray light from reaching the photodetector 13. Some excitation wavelengths are transmitted back through the beam splitter 17. These wavelengths are reflected off the sensor, fiber ends and connectors, and are thus present to some degree in the signal returning to the photodetector 13. Although measurement of temperature or other parameter is made only during intervals between pulses when the LED 15 is turned off, it is desirable to avoid driving the amplifier 31 to a high level during the LED 15 excitation pulses. This is because the amplifier inherently requires some time to recover from either being saturated by a large input signal, or to respond to a large, sharp reduction in the input signal. The second photodetector 201 provides a signal in opposition to that of the photodetector 13, and is timed to counteract the undesired signal component caused by the photodetector 13 receiving radiation from the LED 15. Its LED 203 is driven by a signal in a line 209 from a second drive circuit 207. The waveform of the radiation output of the LED is controlled by the processor 37 over a control line 211.

The luminescent material employed within the fiberoptic sensor 25, or as a layer coated onto a surface whose temperature is being measured, or in some other form, is preferably trivalent chromium doped yttrium aluminum garnet with the specific composition set forth in aforementioned U.S. Pat. No. 5,107,445.

Referring to the waveforms of FIG. 2, some of the operation of the system of FIG. 1, related to the various aspects of the present invention, will be explained. FIG. 2A shows a waveform 213 of excitation radiation from the LED 15. The LED 15 is supplied current during an on pulse 215 and emits substantially no radiation during an off portion 217 of the repetitive cycle. A resulting luminescent signal 219 of FIG. 2B is then generated by the sensor 25. The photodetector 13 receives the luminescent signal 219 plus some radiation directly from the LED 15 during its pulse 215, thereby detecting a combined signal 221 from the sensor 25 and the LED 15.

It is desired to maintain substantially constant the luminescent intensity reaching the photodetector 13 at the instant when the decay time processing is begun, after termination of the excitation pulse 215. In the embodiment being described, the processor 37 controls the circuitry to commence processing of the signal at a time t7, a very short fixed time after the termination of the excitation pulse at time t6. A point 223 on the curve 219 is maintained at a substantially uniform intensity level 225, thus resulting in an output of the photodetector 13 maintaining a level 227 at a point 229 at time t7.

The signal levels are maintained constant by the processor 37 comparing the signal level at time t7 with a desired fixed level. If the measured signal is less than this fixed reference level, the next excitation pulse 215 will be lengthened in duration, as indicated in FIG. 2A by moving a leading pulse edge 231 forward to a position 233. This results in the luminescent sensor being excited with a larger amount of energy and thus causing emission of a greater intensity, as indicated by a curve 235. Conversely, if the signal level at time t7 is too high, the next excitation pulse 215 is made shorter, as indicated by moving the leading edge 231 to a position 237. A reduced luminescent signal indicated by a curve 239 will result. For the conditions illustrated with FIGS. 2A and 2B, the edge of the pulse 215 is properly at the position 231 in order for the returning luminescent signal 219 to have the correct intensity at the time t7, and thus for an output in a line 33 of the amplifier 31 being held at a constant voltage within an optimum range for operation of the A-to-D converter 229. Changes in luminescence intensity level that needs such compensation are caused by factors such as aging, bending of the optical fiber during use, and similar factors.

Because the luminescent signal after termination of the excitation pulse at time t6 rapidly declines in intensity, it is desired to start the digital acquisition of data from that signal as soon after termination of the excitation pulse as possible. This then allows acquisition of sufficient data in order to accurately determine the temperature dependent decay time of the luminescent signal before it drops to a level approaching that of noise in the optical and electronic system. If the signal 221 of FIG. 2C was a true representation of the shape of the output of the photodetector 13 and the amplifier 31, without the compensating photodetector 201, then the second photodetector would be unnecessary. However, it does take time for the photodetector to settle out in response to a step function change in the signal. But an even larger factor is the time it takes for the components of the amplifier 31 to respond to such a sudden change. It is primarily the effect of the amplifier on the signal that requires the delay between times t6 and t7 to be increased. This assures that the processing of the luminescent signal begins only after the amplifier is again following the signal after receiving a sudden change. If the amplifier 31 is allowed to be driven into saturation during the excitation pulse, this fixed time period between t6 and t7 needs to be extended even further.

Therefore, in order to avoid these undesirable effects from termination of the excitation pulse when radiation from the LED 15 leaks through directly to the photodetector 13, a signal is subtracted from the photodetector output signal 221 of FIG. 2C before application to the amplifier 31. An amount is subtracted throughout the duration of the excitation pulse 15 so that the resulting input to the amplifier 31, and thus its output in line 33, does not have the sharp discontinuity shown in FIG. 2C at time t6. Such a compensating signal can be generated and subtracted in a number of ways. It can be subtracted electronically but some effect of circuit delays remain. Therefore, it has been found preferable to subtract the signal optically by using the second photodetector 201 of a similar type with the luminescent signal receiving photodetector 13. No unique artifacts are then introduced. Either by an electrical or optical compensating technique, the signal subtracted could have a uniform magnitude for the duration of the excitation pulse 215, that magnitude being substantially equal to the sudden drop in the signal level at the termination of the excitation pulse at time t6, as illustrated by the curve 221 of FIG. 2C. However, it has been found preferable to apply subtracting pulses whose intensity or duration are controlled by the processor 37 in a closed loop control system in order to maintain the net signal applied to the amplifier 31 substantially constant during the excitation pulse 215. Such a system is easier to control in order to bring about the desired result.

FIG. 2D shows an example of a series of such pulses wherein the widths of the pulses are varied in order to result in a compensated signal 241 that is maintained at substantially the level 243 that is desired at time t6. Thus, there is no sharp change in the signal at time t6. The time t7 at which use of the decaying luminescent signal can begin with assurance of the result being accurate can then be made to occur a very short fixed interval after the end at time t6 of the excitation pulse.

The processor 37 provides to the driver 207, over a line 211, a series of pulses shown in FIG. 2D. These pulses are then converted by the second LED 203 into light pulses that are received by the compensating photodetector 201. The processor 37, in this specific example, starts such a pulse at regular intervals throughout the duration of the excitation pulse 215. The width of each pulse, however, is adjusted to subtract from the output of the photodetector 13 whatever is required to maintain the combined signal in the line 227 at the desired level 243, at least during the last portion of the excitation pulse 215.

The range of the excitation pulse widths is chosen to drive the resulting luminescent signal to 80 or 90 percent of its maximum luminescence for the given excitation pulse intensity. For the preferred luminescent material identified above, that requires a pulse duration of about two times the decay time of the luminescent material. By setting the parameters to result in a higher luminescent signal, fewer measurements can be taken in a given period of time since any increased luminescent signal requires a disproportionate amount of extended excitation pulse duration. The preferred amount of time for acquiring data from which the decay time of a given luminescent signal is determined is about 1.7 times the decay time. Thus, in the curves of FIG. 2, the time from t7 to t8 is maintained at about 1.7 times the last decay time measurement. The next excitation pulse can begin immediately after that time period, at time t8 in FIG. 2, or, if necessary to permit time for processing or further decay in the luminescence before beginning the next pulse, a fixed interval (not shown) of wait time can be inserted at time t8 before the leading edge of next excitation pulse. In either case, both the duration of the excitation pulse between times t1 and t6, and the duration of the luminescence decay between time t6 and the beginning of the next excitation pulse, are under the control of the processor 37 which determines them as a function of the last measured decay time.

Although, for the reasons mentioned previously, it is preferable to adjust the excitation pulse duration while maintaining its intensity substantially constant from pulse to pulse, there may be circumstances where it is desirable to have a few discrete intensity levels that can be selected in addition to the primary control of adjusting the pulse duration. By providing two different intensity levels of the excitation pulses, for example, the system can be switched by the processor 37 into one of two ranges. In each of the ranges, the duration of the excitation pulse is controlled as described above. In order to implement two or more such ranges, the primary LED driver 55 (FIG. 1) is provided with another control signal with the processor 37 in order to adjust the magnitude of the output electrical signal in the line 53 that is connected to the LED 15.

So far in this discussion, only a single channel system as shown in FIG. 1 has been described. That is, a single luminescent material sensor provides a signal that is processed by a single channel electronic system. However, it is possible to use the single electronic system for simultaneously measuring the temperature or other parameter through two or more separate sensors. Generally, this is accomplished by adding a separate optical head 11 for each new sensor, the remaining optical and electronic components remaining the same except that the processor 37 then operates in a manner to sequentially measure the temperature at each of the sensors connected to the system. These measurements are taken fast enough so that the user is provided with temperature readings from all of the sensors substantially simultaneously.

Referring to FIG. 3A, a modification of the system of FIG. 1 is illustrated in order to provide a two channel system. A first optical head 251, constructed similarly to the head 11 of FIG. 1, has a luminescent sensor 253 similar to the sensor 25 of FIG. 1, connected to a length of optical fiber. Similarly, a second optical head 255 and connected sensor 257 are included. An additional number of optical heads and sensors can be added, a convenient number of channels being four.

In any event, each of the photodetectors of the optical heads, corresponding to the photodetector 13 of the optical head 11 of FIG. 1, are connected in parallel to the input line 27 of the amplifier 31. That is, each of the optical head photodetectors is permanently connected to the input of the amplifier 31. No additional compensating photodetectors are provided, however, the single optical coupler 205 being connected in the same manner in FIG. 3A as it is in FIG. 1.

In order to cycle the instrument through its various channels, the excitation LEDs of the optical heads are operated one at a time. That is, the excitation source within the head 251 that corresponds to the LED 15 of FIG. 1 is initially pulsed and data acquired, as discussed above. Only the sensor 253 will be providing a luminescent signal that is processed since the sensor 257 and any other sensors in the system will not receive any excitation radiation. After the excitation LED of the optical head 251 has been pulsed for several cycles, that pulsing is terminated and the pulsing of the LED within the head 255 is commenced instead. The LED driving signal in the line 53 is switched by a multiplexer 259 to one of lines 261, 263, etc., depending upon how many channels are being used in the system, in response to a control signal in a circuit 265 that originates from the processor 37.

Referring to FIG. 3B, the portion of the system of FIG. 3A is shown which is changed to accommodate four optical heads 251, 255, 252 and 256, having corresponding luminescent sensors 253, 257, 254 and 258. The multiplexer 259, in response to a control signal in a circuit 265, causes the LED driving signal in line 53 to be connected with one of the optical head LED's at a time, through respective lines 261, 263, 260 and 262.

A preferred operation of a four channel system is illustrated in FIG. 4. A first channel initially acquires the decay time data in a number of successive cycles of the type described above with respect to FIG. 2. The processor 37 allows the first channel to acquire data for a fixed period of time 265. Therefore, the number of luminescent decay cycles from which data is acquired during the fixed time 265 will vary. The number of cycles depends upon the level of temperature being measured since the duration of each measurement cycle depends upon the temperature being measured. Immediately after all the measurements are taken within the fixed time 265, the processor 37 turns off all the excitation LEDs for an interval until the same repetitive measurement cycle is performed by the optical head of channel two in a time period indicated at 267.

In a first portion 269 of the interval between data acquisition from two different channels, none of the LEDs are being pulsed. The signal from the parallel connection of all the luminescent receiving photodetectors is measured during the time 269 to determine an offset correction factor. In this example, the same number of offset measurements are taken within the time period 269 as the number of measurement cycles during the time 265. After the offset measurements are taken, there may optionally be provided a waiting time 271 to allow the processor 37 to perform the necessary calculations. The data acquired during the time period 265 is combined and a single decay time calculated from the combined data. This average decay time is then outputted and then converted into temperature or other parameter being measured.

Similarly, after data is acquired from the number of decay time cycles that occur during the time 267 for the second channel, an equal number of offset measurements are made during a time 273, followed by another waiting period. Data is then acquired by the third channel in a time 275, followed by an offset measurements during a time 277, and a waiting period. Finally, in order to complete one cycle of operation of a four channel instrument, decay time values are measured for a number of cycles of the fourth channel during a fixed time period 279, followed by offset measurements in a time 281. After another wait period, the process then begins anew with channel one and repeats again through all of the channels.

Referring to FIG. 5, an overview of the operation of the instrument described above is given. In a single channel system, or in one channel of a multi-channel system, a step 285 calls for acquiring and storing data of one luminescent decay cycle. A next step 287 asks whether a certain set amount of time has passed since the data acquisition cycle was commenced. If not, data is acquired of another decay cycle according to the step 285. This proceeds until the fixed time has elapsed, that time being equal to the duration shown in FIG. 4 for acquisition for data for each of the four channels. The processing proceeds to a next step 289 for a number of offset measurements to be made that is equal to the number of decay cycles for which data was just acquired. A next step 291 combines all of the acquired decay time data and the offset measurements to form a single composite set of data. A next step 293 then calculates from this composite set of data an average decay time of the cycles which have been measured. The decay time calculation is preferably made in a manner described in the previously mentioned U.S. Pat. No. 5,107,445.

A next step 295 calls for optionally waiting a time before acquiring and processing any further data. The reason for the wait can be to allow the luminescence intensity to fall to a very low level before beginning the next cycle. In a single channel instrument, the operation then returns by way of a dashed line 297 to the beginning step 285 to acquire another set of data. If a multi-channel unit, however, a next step 299 switches the LED multiplexer 259 to the next channel in order. The processing then returns to the step 285 for that new channel.

Although the present invention has been described with respect to its preferred embodiments, it will be understood that it is to be protected within the scope of the following claims.

It is claimed:

1. A method of measuring a parameter with a plurality of fiberoptic sensors that individually contain a quantity of luminescent material characterized by emitting, in response to excitation radiation, luminescence radiation having a characteristic that varies as a function of said parameter, comprising the steps of:

individually communicating the luminescent radiation from the sensors onto respective photodetectors, permanently connecting said photodetectors in parallel to an input of an analog amplifier, alternately directing excitation radiation to said plurality of sensors, one of said plurality of sensors at a time, thereby to generate luminescence signals from said plurality of sensors in time sequence at the amplifier input, whereby the amplifier output carries a signal representing in time sequence said characteristic of the luminescence of the individual sensors, processing the amplifier output signal in order to measure in time sequence said characteristic of the luminescence radiation of the individual sensor, and determining from said measured characteristic of the individual sensors a value of the parameter being measured by the respective individual sensors.

2. The method according to claim 1 wherein the plurality of fiber optic sensors includes exactly four fiberoptic sensors.

3. The method according to claim 1 wherein said luminescence radiation characteristic includes a luminescence intensity decay time.

4. The method according to claim 1 wherein said parameter includes temperature.

5. A method of measuring a parameter with a plurality of fiberoptic sensors that individually contain a quantity of luminescent material characterized by emitting, in response to excitation radiation, luminescence radiation having a characteristic that varies as a function of said parameter, comprising the steps of:

individually communicating the luminescent radiation from the sensors onto respective photodetectors, permanently connecting said photodetectors in parallel to an input of an analog amplifier, alternately directing excitation radiation to said plurality of sensors, one of said plurality of sensors at a time, thereby to generate luminescence signals from said plurality of sensors in time sequence at the amplifier input, whereby the amplifier output carries a signal representing in time sequence said characteristic of the luminescence of the individual sensors, processing the amplifier output signal in order to measure in time sequence said characteristic of the luminescence radiation of the individual sensors, said processing including the step of subtracting from the measure of said characteristic of the luminescence radiation of the individual sensors a quantity that compensates for a portion of the excitation radiation that strikes the respective photodetectors with which the individual sensors communicate their luminescent radiation, thereby to produce a compensated output signal, and determining from said measured characteristic of the individual sensors values of the parameter being measured by the respective individual sensors.

6. A method of measuring individual temperatures at a plurality of locations from a single instrument, comprising the steps of:

positioning one of a plurality of individual temperature sensors at each of said plurality of locations, wherein the sensors individually contain a quantity of luminescent material that is characterized by emitting, in response to excitation radiation, luminescence radiation that decays at a rate dependent upon said material's temperature, providing, as part of the single instrument, a plurality of photodetectors that are individually maintained in optical communication with one of the sensors through individual optical fiber media, directing excitation radiation from the single instrument through said optical fiber media to said plurality of sensors, one sensor at a time, thereby causing their temperature dependent luminescence to illuminate respective photodetectors one at a time, whereby the photodetectors generate, one at a time, electrical signals at individual outputs thereof that are related to the luminescence incident thereon, causing the electrical outputs of the plurality of photodetectors to be connected together into a common circuit within the single instrument at least while excitation radiation is being directed to any one of the plurality of sensors, and processing electrical signals of the common circuit in a manner to measure the temperature dependent rate of luminescence decay from the plurality of sensors, one at a time, determining the individual temperatures at said plurality of locations from said measured rate of luminescence decay of the individual sensors.

7. A method of measuring individual temperatures at a plurality of locations from a single instrument, comprising the steps of:

positioning one of a plurality of individual temperature sensors at each of said plurality of locations, wherein the sensors individually contain a quantity of luminescent material that is characterized by emitting, in response to excitation radiation, luminescence radiation that decays at a rate dependent upon said material's temperature, providing, as part of the single instrument, a plurality of photodetectors that are individually maintained in optical communication with one of the sensors through individual optical fiber media, directing excitation radiation from the single instrument through said optical fiber media to said plurality of sensors, one sensor at a time, thereby causing the temperature dependent luminescence of the sensors to illuminate respective photodetectors one at a time, whereby the photodetectors generate, one at a time, electrical signals at individual outputs thereof that are related to the luminescence incident thereon, causing the electrical outputs of the plurality of photodetectors to be connected together into a common circuit within the single instrument at least while excitation radiation is being directed to any one of the plurality of sensors, processing electrical signals of the common circuit in a manner to measure the temperature dependent rate of luminescence decay from the plurality of sensors, one at a time, said processing including the step of subtracting from the electrical signal at the output of the common circuit a quantity that compensates for a portion of the excitation radiation that strikes the photodetectors, thereby to produce a compensated output signal, and determining the individual temperatures at said plurality of locations from said measured rate of luminescence decay of the individual sensors.

8. A measurement method, comprising the steps of:

positioning one of a plurality of individual temperature sensors at each of a plurality of locations, wherein the sensors individually provide a temperature dependent optical signal when interrogated, providing a plurality of photodetectors that are individually maintained in optical communication with one of the sensors, interrogating said plurality of sensors, one sensor at a time, thereby causing the sensors to provide the temperature dependent optical signals one at a time to their respective photodetectors, whereby the photodetectors generate, one at a time, electrical signals at individual outputs thereof that are related to the optical signals incident thereon, causing the electrical signal outputs of the plurality of photodetectors to be connected together into a common circuit at least while any one of the plurality of sensors is being interrogated, processing the electrical signals of the common circuit in a manner to measure the temperature dependent optical signals from the plurality of sensors, one at a time.

9. A multi-sensor measuring system comprising:

a plurality of sensors containing luminescent material, each sensor being attached to one end of a different one of a plurality of optical fiber communication channels, said luminescent material being characterized by emitting, in response to excitation radiation, luminescence radiation that exhibits a rate of intensity decay that is related to the material's temperature, a plurality of photodetectors, each of said plurality of photodetectors being optically coupled with another end of a unique one of said plurality of optical fiber communication channels, each of said plurality of photodetectors generating a separate electrical output that is related in value to an amount of luminescent radiation incident upon it from its associated luminescence material sensor, an electrical signal amplifier having an input that permanently receives the electrical output of each of said plurality of photodetectors in parallel, said amplifier having an electrical signal output, means optically coupled with said another end of each of said plurality of optical fiber communication channels for directing excitation radiation to at least any selected one of the plurality of luminescent material sensors at a time, means connected with said excitation radiation directing means for causing said excitation radiation to be directed to each of the sensors in sequence, one sensor at a time, thereby to generate the electrical signal output of the amplifier that represents intensities of the luminescence radiation from the plurality of sensors in time sequence, and means receiving the amplifier output signal for determining in time sequence the rate of intensity decay of the luminescence radiation from each of the plurality of sensors.

* * * * *